(12) United States Patent
Wahl et al.

(10) Patent No.: US 6,677,565 B1
(45) Date of Patent: Jan. 13, 2004

(54) HIGH SPEED AUTOFOCUS AND TILT FOR AN OPTICAL IMAGING SYSTEM

(75) Inventors: Michael Hermann Wahl, San Diego, CA (US); Kenneth Howard Womack, San Diego, CA (US); Phillip Gregory Roberts, San Diego, CA (US)

(73) Assignee: Veeco Tucson Inc., Tucson, AZ (US)

( * ) Notice: Subject to any disclaimer, the term of this patent is extended or adjusted under 35 U.S.C. 154(b) by 0 days.

(21) Appl. No.: 09/135,734

(22) Filed: Aug. 18, 1998

(51) Int. Cl.[7] ................................................. G02B 7/04
(52) U.S. Cl. .................................. 250/201.3; 250/559.3
(58) Field of Search ........................... 250/201.3, 559.3, 250/201.2, 559.29, 306, 307, 548, 216; 356/399–401, 237.1, 237.4, 239.1, 239.2, 237.5; 396/111, 89; 355/53, 55

(56) References Cited

U.S. PATENT DOCUMENTS

| | | |
|---|---|---|
| 4,577,095 A | 3/1986 | Watanabe |
| 4,725,722 A | 2/1988 | Maeda et al. |
| 4,945,220 A | 7/1990 | Mallory et al. |
| 5,122,648 A | 6/1992 | Cohen et al. |
| 5,136,149 A | 8/1992 | Fujiwara et al. |
| 5,208,451 A | 5/1993 | Deck |
| 5,239,170 A | 8/1993 | Hughlett |
| 5,483,055 A | 1/1996 | Thompson et al. |
| 5,604,344 A | 2/1997 | Finarov ................. 280/201.3 |
| 5,714,749 A * | 2/1998 | Yonezawa et al. ........ 250/201.3 |
| 5,784,164 A * | 7/1998 | Deck et al. ............. 250/201.3 |
| 5,795,295 A * | 8/1998 | Hellmuth et al. .......... 600/407 |

\* cited by examiner

*Primary Examiner*—Que T. Le
(74) *Attorney, Agent, or Firm*—Boyle Fredrickson Newholm Stein & Gratz S.C.

(57) ABSTRACT

The present invention provides a method and apparatus for high-speed autofocus and tilt of an inspection surface in a microscope system. The method and apparatus herein described projects an array of spots, lines, circles, grids or other shapes on the surface to be adjusted. The superposition of the array on the surface is imaged by a CCD camera and captured for subsequent analysis. Analysis of the captured image determines both the distance and angle through which the surface must be adjusted to bring it into the focal plane of the optical system. Focus and tilt error is estimated by comparing image dilation and distortion with calibrated data.

44 Claims, 8 Drawing Sheets

HIGH SPEED AUTOFOCUS AND TILT FOR AN OPTICAL IMAGING SYSTEM

FIELD OF THE INVENTION

The invention relates generally to the field of automated focus adjustment for imaging optical systems, and in particular to autofocus and tilt adjustment for microscope systems.

BACKGROUND OF THE INVENTION

Magnetic recording heads are manufactured using processes and techniques similar to those of integrated circuit fabrication. Deposition, lithography and etch processes are performed on AlTiC ceramic wafers to form an array of thin film read/write transducers. Wafers are then sliced into bars, whereupon the air bearing surfaces are formed by precision machining and lapping. Finally the bars are cut into individual sliders or heads. At this point, it is desirable to inspect each head for defects or damage before they are attached to a suspension and subsequently integrated into the disk drive assembly. Optical inspection of recording head surfaces and read/write transducers must be capable of accommodating a wide variety of structural and material properties. Air bearing surfaces are complex 3-dimensional structures fabricated from granular ceramic composites while head read/write transducers are micron-size metal/insulator structures. For such applications, optical head inspection systems typically comprise semi-automated microscopes that require a human operator to visually detect and classify defective heads and often to operate the microscope itself. Over one billion heads per year are fabricated and inspected in this fashion. Clearly, it would be highly desirable to conduct optical head inspection in a completely automated manner.

A major component in an automated optical inspection microscope is the autofocus system, which should be fast, accurate and robust. Generally such systems comprise a focus sensor and a focus driver. The sensor provides a focus error signal that is indicative of variations of the optical system focal plane from the actual object plane. The driver is usually a motor and stage combination that adjusts either the object or the focal plane in response to the focus error signal.

Microscope autofocus systems typically utilize a focus figure of merit based on image intensity or image contrast as the focus sensor signal. For example, U.S. Pat. No. 5,483,055 by Thompson et al. discloses a microscope autofocus system that uses a laser beam focussed through the microscope objective onto the surface of interest. The intensity of the reflected beam is measured by a photodetector and continuously monitored to achieve a maximum as the object is positioned near the focal plane of the microscope. While such systems may be adequate for inspecting smooth, reflecting surfaces, they may be limited in speed when large variations in topography or reflectivity are encountered.

Another common autofocus technique utilizes some criterion for image contrast such as the sharpness of a well-defined object edge. In optical inspection microscopes, in particular for those used in IC manufacturing and inspection, a pattern is projected onto the object surface through the microscope objective, and the superposed image analyzed for pattern contrast. U.S. Pat. No. 4,725,722 by Maeda et al., U.S. Pat. No. 4,945,220 by Mallory et al. and U.S. Pat. No. 5,604,344 by Finarov each disclose microscopes using projected pattern contrast for autofocus control. Again, such systems may be adequate for inspecting smooth surfaces such as semiconductor wafers, but are not readily usable for rough granular, surfaces where the superposed image may have a low degree of contrast.

Still another effective method for microscope autofocus is triangulation where oblique illumination of a surface of interest produces a specular reflected beam that shifts in response to changes in the sample position. Position sensitive detectors are placed in the return path of the beam to detect the displacement. Triangulation autofocus systems are disclosed in U.S. Pat. No. 4,577,095 by Watanabe and U.S. Pat. No. 5,136,149 by Fujiwara et al. In particular, U.S. Pat. No. 5,136,149 discloses a triangulation system for autofocus that can also correct for tilted test surfaces. Autofocus and tilt is desirable when a large test surface is warped or curved such as may occur in semiconductor wafer manufacturing. The method for autofocus and tilt disclosed by Fujiwara et al. utilizes triangulation from a single point on the test surface. For complex test surfaces having facets and other structures, a single test point may not provide adequate tilt information for the majority of the surface.

For automated head inspection, it would be highly desirable to employ an autofocus and tilt system that can accommodate air-bearing surfaces presented in a variety of orientations including tilted surfaces.

SUMMARY OF THE INVENTION

It is an object of the present invention to provide a fast, accurate and robust autofocus system for an inspection microscope. Another object of the present invention is to provide a combination autofocus and tilt system for an inspection microscope. Yet another object of the present invention is to provide an autofocus and tilt system capable of accommodating complex test surfaces such as magnetic recording heads.

In accordance with a first aspect of the present invention, an autofocus system in an inspection microscope utilizes a light pattern projected onto a test surface through the microscope objective. An image of the light pattern on the test surface is recorded and analyzed to determine a focus error. The light pattern image is analyzed in portions to determine specific properties of the respective portions. In a basic embodiment of the present invention, the positions of respective portions are determined and compared to calibration data to determine a focus error. The focus error is sent to a motion control system for applying a focus correction to an adjustable microscope stage. In a preferred embodiment of the present invention, a tilt error is also derived from an analysis of the light pattern image.

In accordance with a second aspect of the present invention, an autofocus apparatus for a microscope comprises a translatable stage for positioning a test surface in opposition to a microscope objective and a light pattern generator for projecting a light pattern onto the test surface. The autofocus apparatus further comprises an imaging system for recording an image of the light pattern on the test surface and a processor for analyzing the light pattern image. In accordance with the present invention, the processor analyzes portions of the light pattern image to determine a focus error for the test surface. In a basic embodiment, the processor determines the relative positions of respective portions of the light pattern image and compares these positions to calibrated positions to determine a focus error. The autofocus apparatus further comprises a motion control system to apply a focus correction to the translatable stage. In a preferred aspect of the present invention, the processor also determines a tilt error from an analysis of the light pattern image and a tilt correction is applied by the motion control system to a rotatable stage.

In accordance with yet another aspect of the present invention, a method for automatically focussing a test surface in a microscope comprises projecting a light pattern onto a test surface positioned near the focal plane of the microscope. An image of the light pattern on the test surface is recorded and analyzed by a processor to determine the positions of respective portions of the light pattern image. Comparing those positions to calibration data determines a focus error and preferably also a tilt error. The error signals are sent to a motion control system and corrections are applied to a microscope stage holding the test surface.

These and other objects and aspects of the present invention will become more apparent upon considering the following detailed description and the accompanying figures.

DETAILED DESCRIPTION OF THE PREFERRED EMBODIMENTS

In accordance with the principles of the present invention, an autofocus and auto-tip/tilt system for a microscope utilizes a projected light pattern subtending substantially most of a test surface to be adjusted. The projected pattern changes size and shape as the test surface is translated and tilted. Parameters derived from the changing pattern are calibrated and stored in memory for comparing to the pattern projected on an arbitrary test surface. Image parameters from the test surface are compared to the calibrated parameters to derive a focus and tip/tilt adjustment. Preferred image parameters of the present invention are positions and shapes of respective portions of a projected light pattern.

Figure 1:
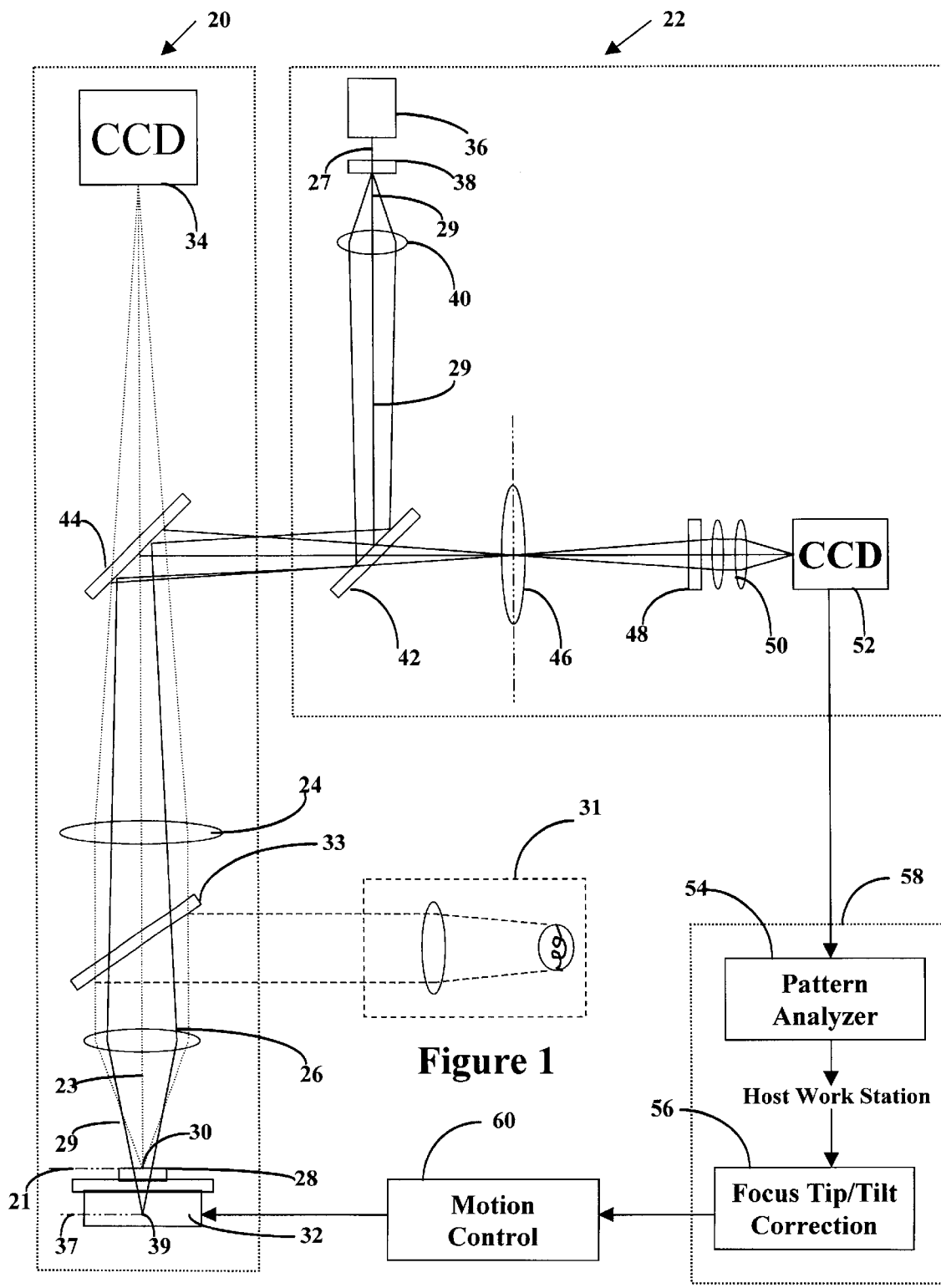
FIG. 1 is a schematic illustration of an autofocus and tilt system of the present invention.

A preferred embodiment of a microscope having an autofocus and tilt system in accordance with the present invention is shown in FIG. 1. A microscope assembly 20 comprises a representative imaging microscope such as may be used in an optical inspection system. The microscope 20 typically comprises an illumination source 31 for illuminating a test surface 30 of a part to be inspected 28. The test part 28 is mounted to a microscope stage 32 that is capable of translation along the optical axis (Z-direction), and rotation about the X- and Y-axis, herein referred to as tip/tilt or simply tilt (referring to rotation about one or both the X- and Y-axis). The test part 28 is positioned substantially at the focal plane 21 of the microscope objective 26. The microscope assembly 20 also comprises a tube lens 24, beam splitter 44 and a camera 34, such as a CCD camera positioned at the microscope image plane.

In typical operation, the illumination source 31 provides light for imaging the test surface 30 for inspection. The illumination is coupled into the microscope via the beam splitter 33, and directed to the test surface 30 through the microscope objective 26. Ideally, the test surface 30 is positioned at the focal plane 21 of the objective 26, and oriented normal to the optical axis of the microscope 20 using the adjustment provided by the stage 32. In this fashion the test surface 30 is imaged onto the CCD camera 34 for optical inspection. Variations in the position or orientation of the test part 28 may lead to poor image quality, thus requiring adjustment for focus or tilt.

The optical assembly 22 schematically illustrates a preferred embodiment of an autofocus and tilt system in accordance with the present invention. For simplicity, the autofocus and tilt system 22 will herein be referred to as simply the autofocus system 22 where now tilt is considered an inherent part of the invention. The input portion of the autofocus system 22 is comprised of a light source 36, a pattern generator 38 positioned in the light beam 27, a field/focus lens 40 positioned further along the optical axis and a beamsplitter 42 positioned to direct a portion of the light into the microscope assembly 20. The pattern generator 38 is an optical element that generates a predetermined pattern of light beams 29 from the input light beam 27. The light pattern 29 is projected onto the test surface 30 via the lens 40, the beamsplitter 42 and microscope optics (beamsplitter 44, tube lens 24 and objective 26). The field/focus lens 40 further establishes a second focal plane 37 for the light beam pattern 29 that is offset from the microscope focal plane 21. The second focal plane 37, herein referred to as the pattern focal plane, is a plane where the light pattern 29 converges to a singular light spot. In accordance with a basic principle of the present invention, the microscope focal plane 21 and the light pattern focal plane 37 are offset so that the projection of the light pattern onto the sample surface changes size and shape as the sample surface 30 is translated and tilted. After reflecting from the test surface 30, the light pattern 29 is directed out of the microscope via the beamsplitter 44 and through the beamsplitter 42. Finally, the light pattern 29 is projected onto a second camera 52 using the field lens 46 and focus lens 50. Preferably a filter 48, such as an interference filter, is used to pass the light pattern 29, but block most of any accompanying illumination light.

The light source 36 may be a laser diode operating at a wavelength compatible with the response of the camera 52, but is preferably a HeNe laser to reduce wavelength fluctuations. The camera 52 is preferably a CCD camera as shown in FIG. 1, but may also be other types. The pattern generator 38 may be an aperture array but is preferably a diffractive element such as a holographic grating. In the present preferred embodiment, the pattern generator produces an array of spots having nominal profiles equivalent to the input laser beam profile. It will be appreciated by those skilled in the art that other light patterns and generation means may be used in accordance with the present invention. In particular, parallel lines, grid arrays or concentric circles would be useful alternative patterns.

An image of the test surface with the superimposed light pattern is provided by the CCD camera 52 and received by a host computer 58 comprising a pattern analyzer 54 and a processor 56 for deriving a focus and tilt correction. The focus and tilt correction is transmitted to a motion control system 60 that in turn controls the sample stage 32.

Figure 2:
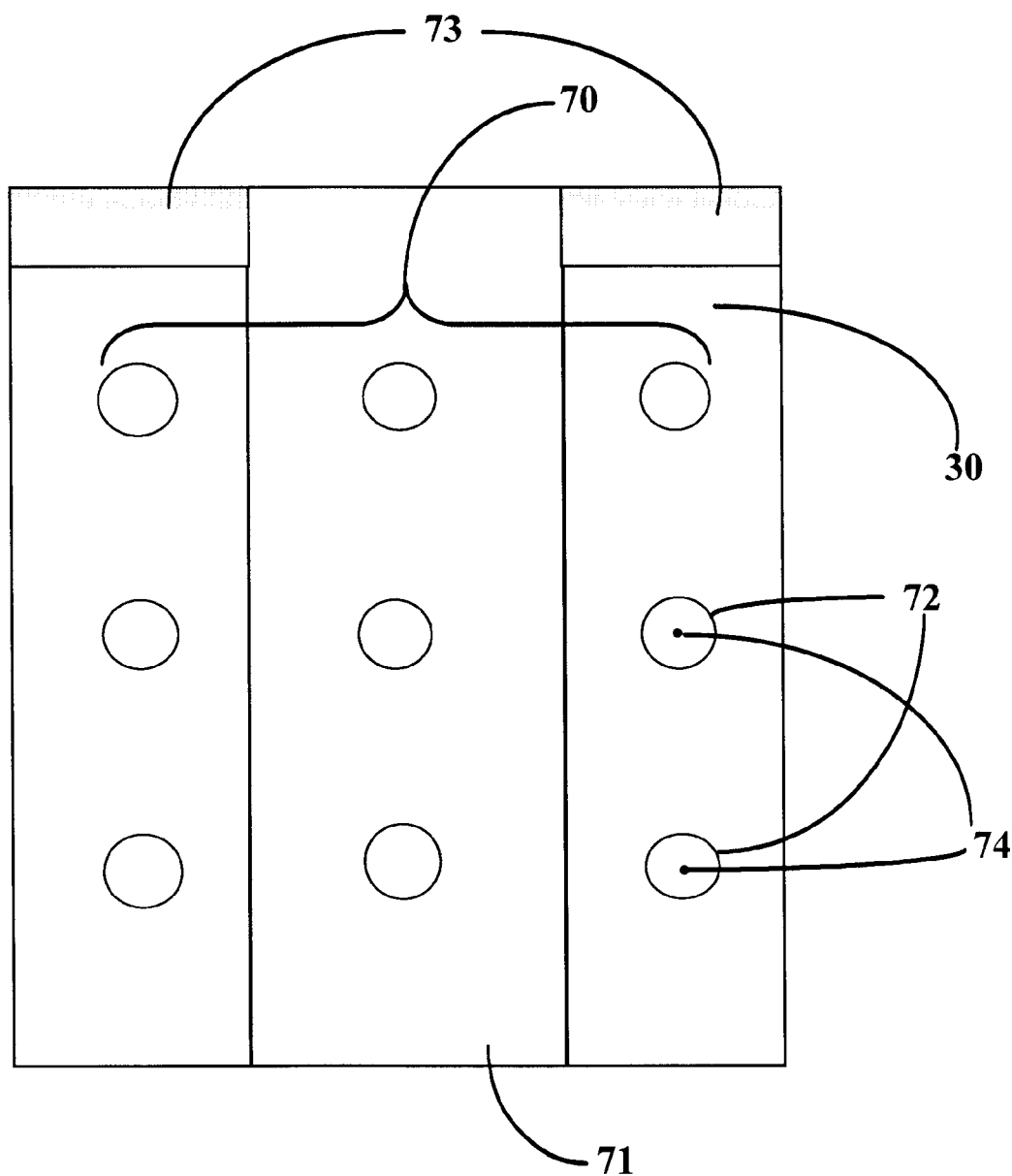
FIG. 2 is a schematic image of a light pattern projected onto a test surface.

The light pattern 29 is projected onto the test surface 30 so that it subtends substantially most of the test surface within the field of view of the microscope. Shown in FIG. 2 is a top view of the test surface 30, upon which is superimposed the light pattern 29, in this case comprising a 3×3 array 70 of substantially circular spots 72. As shown in FIG. 2, the 3×3 array 70 subtends substantially most of the test surface 30, thereby providing focus and tilt information for most of the test surface 30. Having the light pattern cover most of the test surface is advantageous for providing focus and tilt information on complex or non-uniform surfaces. For example, shown here is a test surface 30 comprising the air-bearing surface of a magnetic recording head having a large trough 71 and beveled edges 73. In accordance with the present invention, a preferred projected pattern should subtend most of the surface that is to be imaged by the microscope, thereby allowing focus and tilt information to be derived from most of the surface. The final focus and tilt position achieved by the system of the present invention preferably accounts for an average over substantially most of the imaged surface. The position of a spot 72 with respect to the test surface is preferably characterized by a spot centroid 74 that represents an intensity weighted average over the individual spot 72. In the present preferred embodiment the light pattern 29 comprising the 3×3 array of light spots 70 is characterized by the loci of spot centroids 74.

Figure 3:
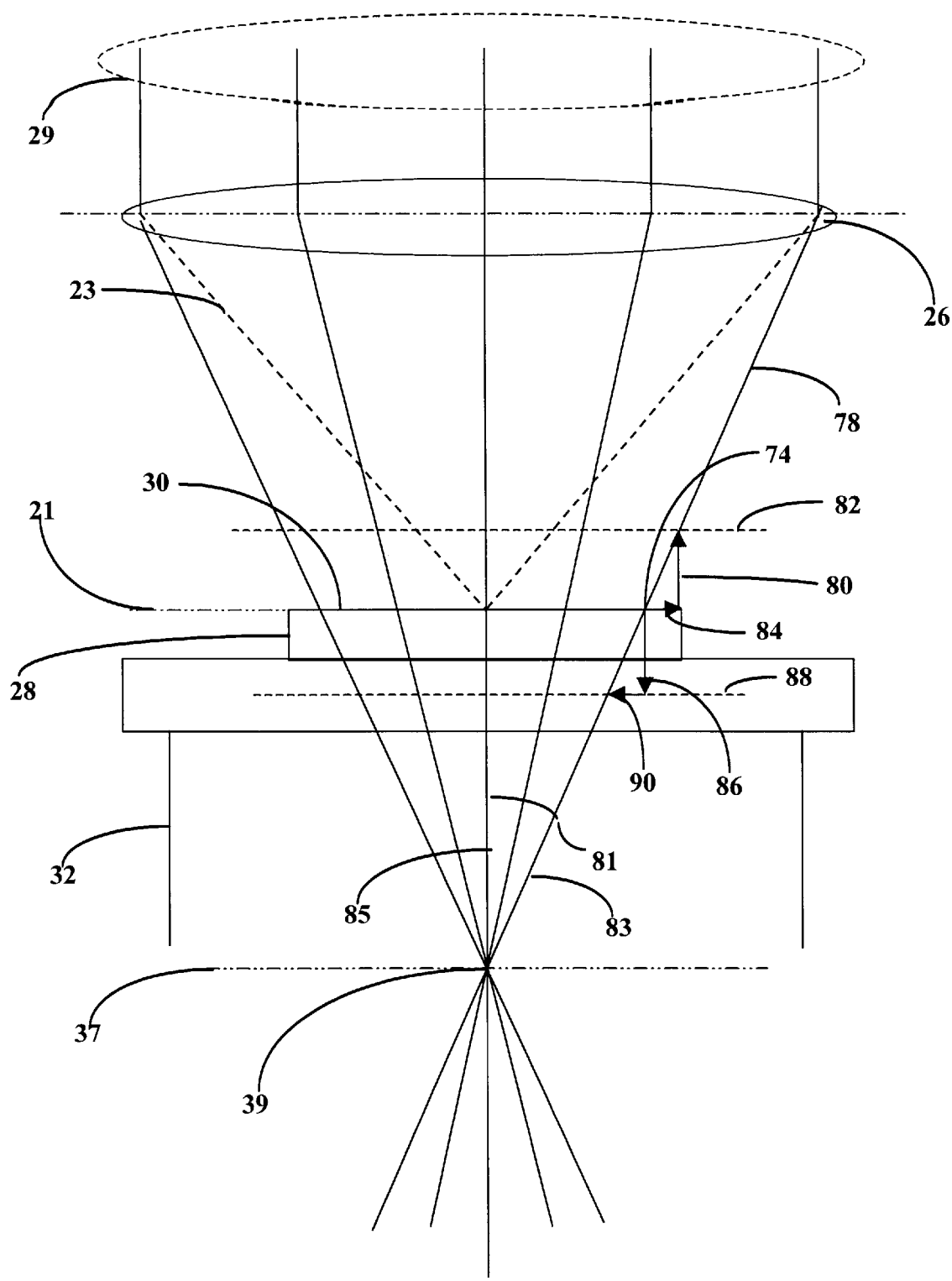
FIG. 3 is a schematic side view of a light pattern projected on a test surface.

A close-up side view of the sample 28, as shown in FIG. 3, illustrates the basic operation of the present invention for achieving a focused sample position. As shown in FIG. 3, the projected pattern 29 comprising spot centroid loci 74 is represented here by the light rays 78 where each light ray 78 represents the path traced by a spot centroid 74. The light rays 78 propagate through the objective 26, which causes the projected pattern to converge substantially through a single ray at the pattern focal plane 37. For example a set of light spots equidistant from the optical axis define a cone whose apex 39 is located substantially in the light pattern focal plane 37. The test surface 30 is positioned substantially at the microscope focal plane 21, where the spot centroids 74 are distributed over a substantial portion of the test surface 30. If the test surface 30 is displaced from the focal plane 21, for example by the z-displacement 80 to the plane 82, then the spot centroid 74 will undergo a lateral displacement 84 relative to the test surface 30. Similarly, if the test surface 30 is displaced by the z-displacement 86 to the plane 88 then the spot centroid 74 will undergo an opposite lateral displacement 90 relative to the test surface 30. Thus, displacement of the sample surface 30 causes dilation or contraction of the projected pattern 29 with respect to the test surface 30.

Referring again to FIG. 3, the focus sensitivity is determined by the amount of dilation or contraction encountered for a given z-translation and is given by $\delta r = \tan\theta \delta z$. $\delta r$ (84, 90) is the lateral shift in centroid position for a z-translation $\delta z$ (80, 86) and the angle $\theta$ (81) is the angle subtended by the light ray 83 with the optical axis 85. Thus, in accordance with one aspect of the present invention, a focus error signal is based on the dilation or contraction of a projected pattern.

Figure 4:
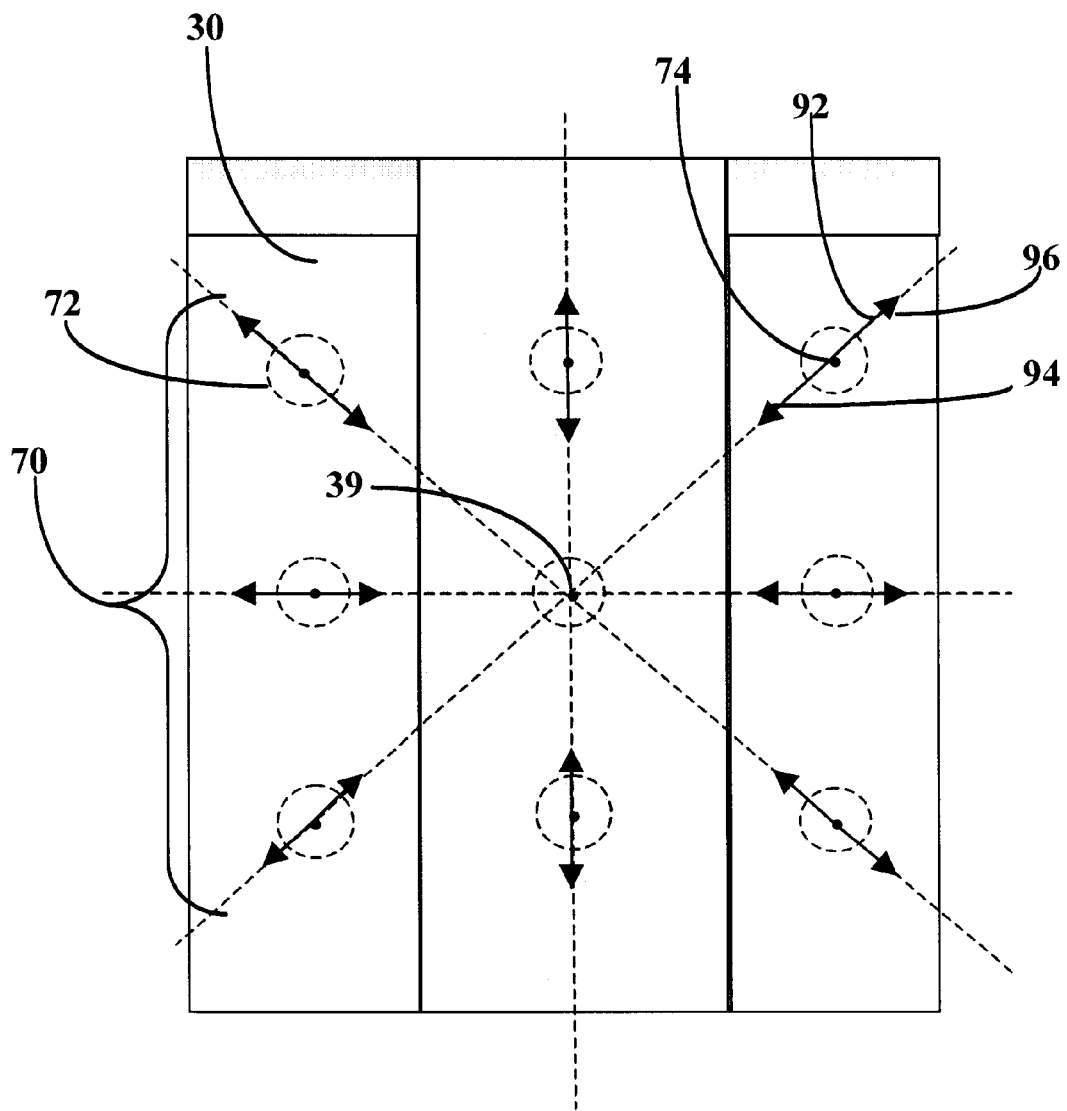
FIG. 4 is a projected pattern as a function of z-translation.

To calibrate the focus correction, an image is recorded for a series of z-translations, thereby producing a locus of points for each spot centroid 74 of the projected pattern 29. As shown in FIG. 4, z-translation of the test surface causes the spot centroids 74 to shift position with respect to the test surface 30 along the radial trajectories 92. For example, a z-translation toward the focal plane 37 causes the spot centroid 74 to shift toward the apex 39 (direction 94). Similarly, a z-translation away from the focal plane 37 causes the spot centroid 74 to shift away from the apex 39 (direction 96). In accordance with the present invention, a calibration procedure determines the positions of the spot centroids corresponding to the microscope focal plane 21 as well as the centroid positions corresponding to a series of z-translations away from the focal plane 21. The centroid positions for an arbitrary test surface are then compared to the calibrated centroid positions to determine the focus correction in a single step process. In comparison to image contrast-based focussing, it will be appreciated that a unique focus correction is determined without the need to perform time-consuming iterations.

Figure 5:
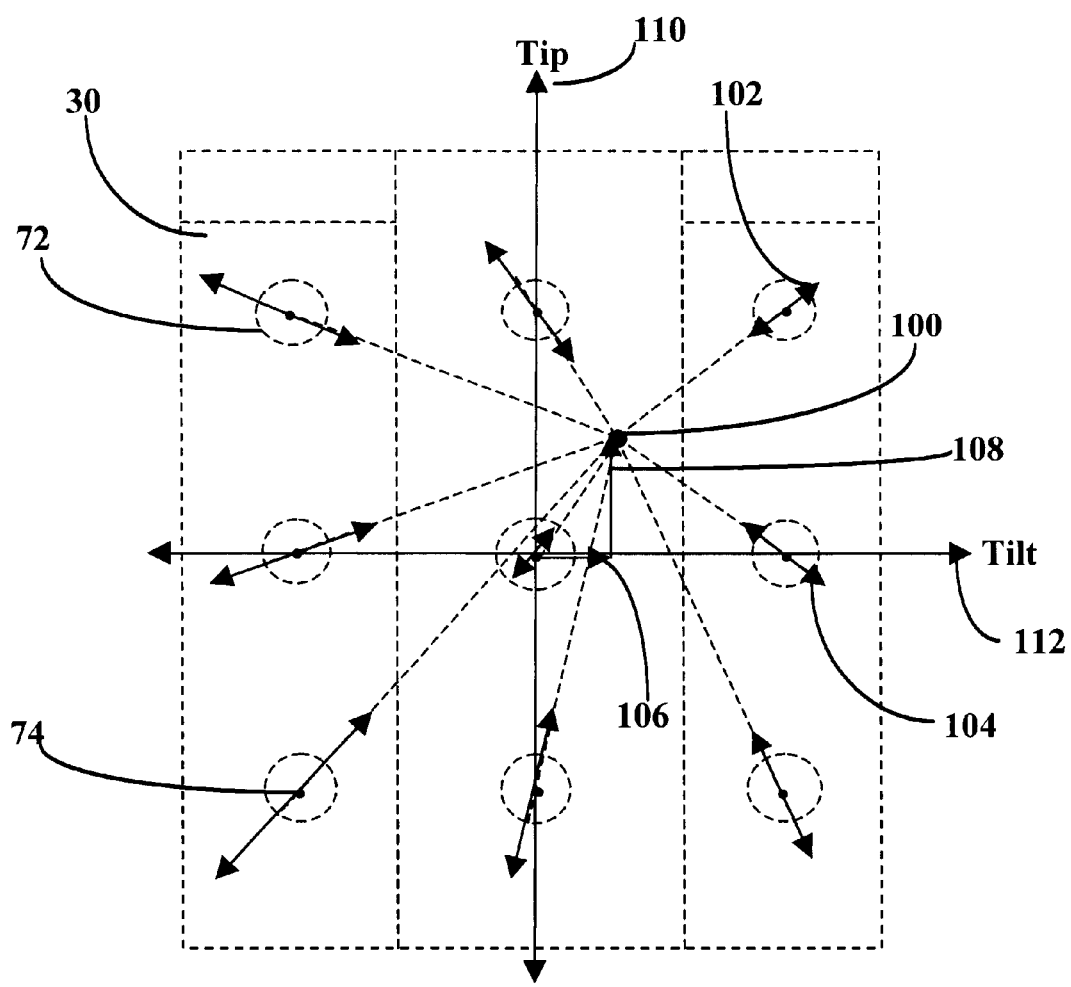
FIG. 5 is a light pattern projected on a tilted surface as a function of z-translation.

Similarly, a tilt of the sample surface 30 causes a distortion of the projected pattern 29 with respect to the test surface 30. In accordance with a basic aspect of the present invention, a measure of size and distortion of the projected pattern 29 can be calibrated with respect to translation and tip/tilt of the test surface 30 thereby providing a focus and tip/tilt correction. In the present preferred embodiment, tip/tilt estimation is achieved by determining the projection of the light pattern onto a surface that is tilted (or tipped) with respect to the focal plane. Tip/tilt angles are derived from a comparison of the projected light pattern with calibrated projections. If the test surface 30 is tipped or tilted with respect to the microscope focal plane 21, then the spot centroid loci are modified from the simple radial trajectories as a function of z-translation as previously shown in connection with FIG. 4. FIG. 5 shows the centroid loci 74 and their respective trajectories 102 as a function of z-translation for a particular tip and tilt condition. It will be appreciated by those skilled in the art that a tip/tilt condition effectively shifts the apex 39 (FIG. 4) to the new position 100 (FIG. 5) with respect to the test image, indicative of a degree of tip or tilt. For an arbitrary tip/tilt condition, the shifted position for the apex 100, based on the modified trajectories 102, is resolved into separate tip and tilt components 106, 108 respectively. A calibration procedure establishes a 2-dimensional tip/tilt scale, represented here by a tip axis 110 and a tilt axis 112 Thus it is possible to determine a tip/tilt correction by determining the direction and degree to which the apex 100 is shifted. It will be appreciated by those skilled in the art that the tip/tilt estimation herein disclosed comprises estimating a best plane fit to the projection of the light pattern on the test surface, wherein the plane fit is tilted with respect to the microscope focal plane.

A focus/tilt calibration procedure in accordance with the present invention comprises recording a series of images as a function of z-translation with no tilt to determine a focus correction calibration based on the spot centroid trajectories 92 (FIG. 4). It is preferable to conduct a series of image processes in order to determine accurately the centroid of each light spot. For example, after an image is recorded, it is preferable to establish an intensity threshold for locating the spot regions. A cluster or blob analysis is then desirable for locating the approximate region for each light spot. An intensity-weighted average over each blob determines the spot centroid. For tip and tilt, the aforementioned calibration is executed in the presence of predetermined values for tip and tilt. The tip/tilt calibration determines the trajectories 102 of the spot centroids 74 for a range of tip/tilt conditions and furthermore calibrates the tip/tilt scales 110 and 112 based on the resultant shifts of the apex 100.

Figure 6:
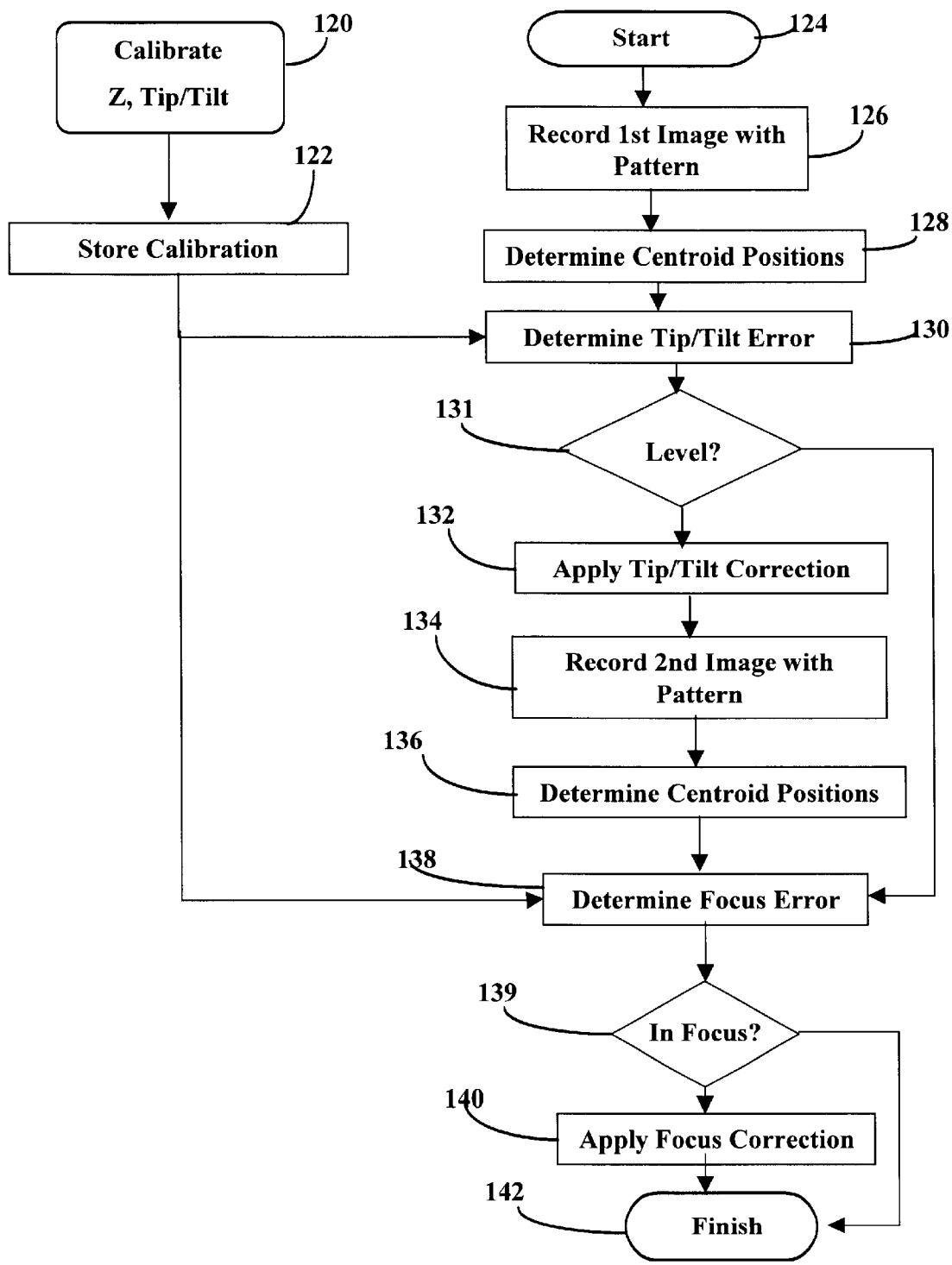
FIG. 6 is a flow chart for autofocus/tilt operation in accordance with the present invention.

Operation of a microscope using the present inventive autofocus and tilt system is outlined in the flow chart of FIG. 6. First an offline z/tip/tilt calibration is performed and the results stored, as represented here by process blocks 120 and 122. In automated operation, the start (block 124) of an inspection process may comprise loading a carrier of test parts onto the microscope stage. Next, an image of a test part with the projected pattern is recorded as indicated by block 126. Preferably two images of the projected pattern are taken at different z-translations. In block 128 the spot centroids are determined using image processing techniques as previously described in connection with the calibration procedure. Once the spot centroids are determined, their positions are compared to the tip/tilt calibration data in order to determine the magnitude and direction of the shift of the apex 100 with respect to a level reference condition (block 130). A tip/tilt correction is derived from this comparison. As indicated by block 132, at this point a tip/tilt correction is applied to the microscope stage. Once leveled, another image is captured (block 134) and centroid positions determined (block 136). These centroid data are compared to the z-calibration data to determine a focus correction (block 138). The focus correction is then applied to the microscope stage (block 140) to complete the focus/tip-tilt operation. An advantageous aspect of the present invention is the open-loop operation, where only two or three images are used to achieve a level, focussed test surface.

Figure 7:
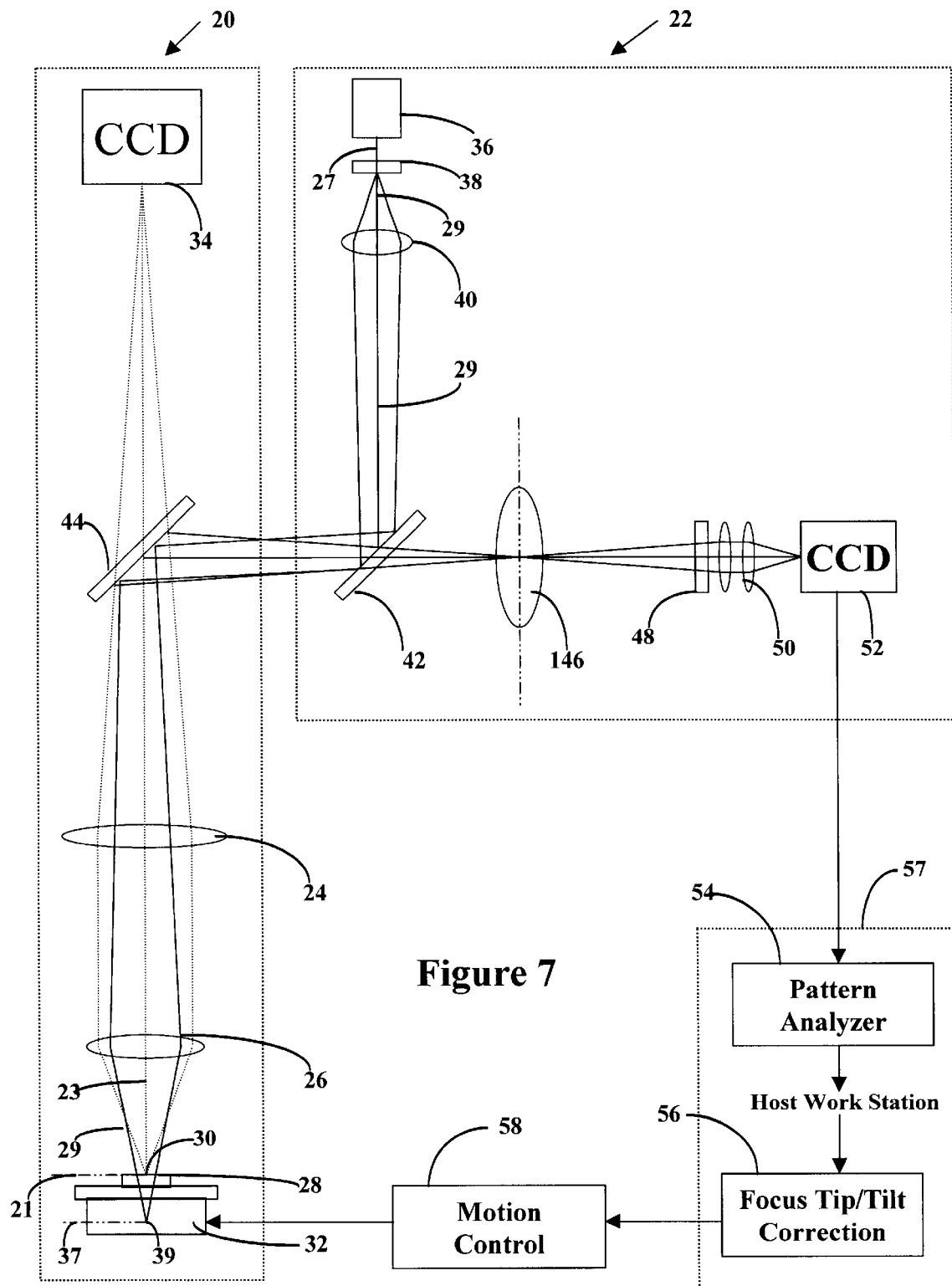
FIG. 7 is an illustration of an astigmatic autofocus system of the present invention.
Figure 8:
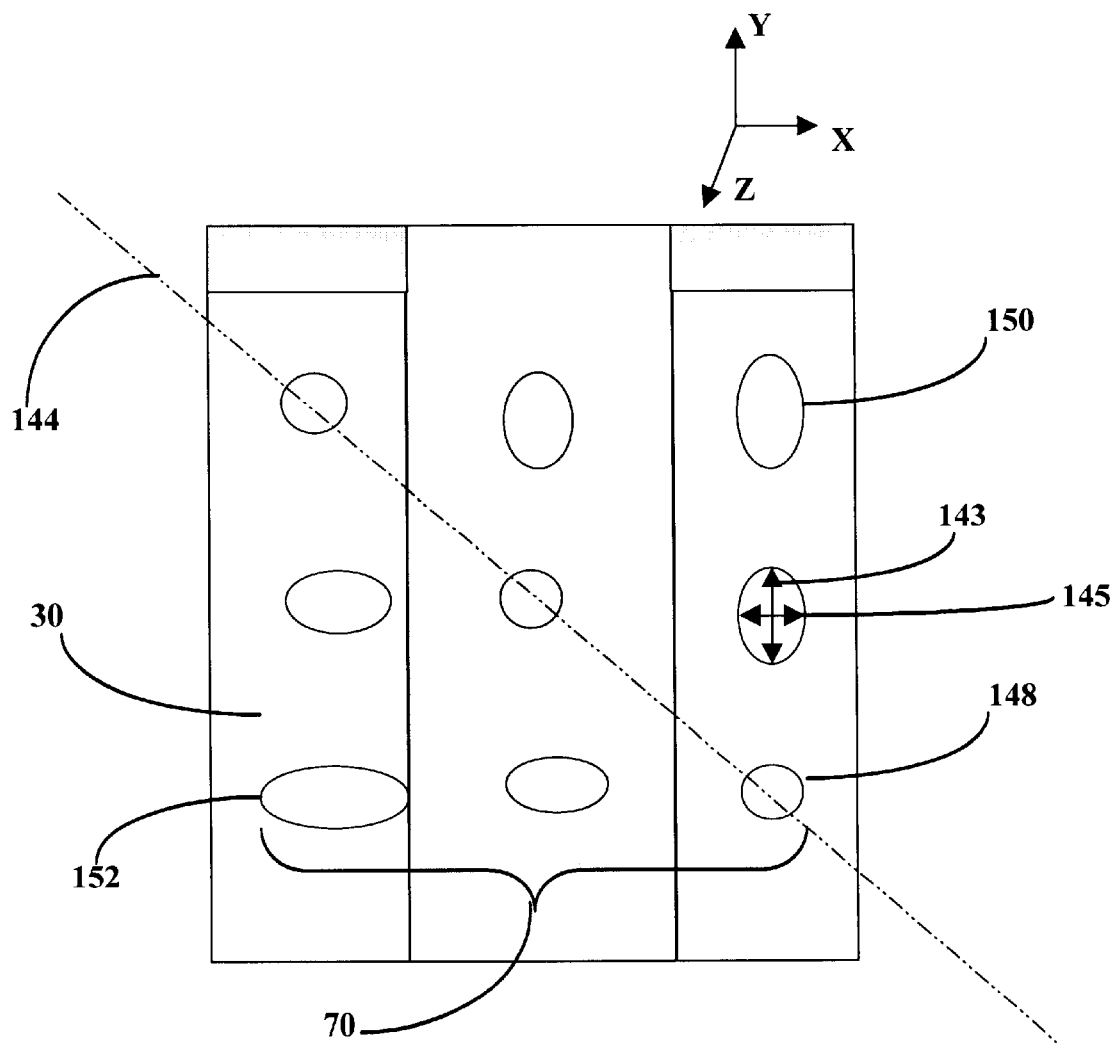
FIG. 8 is a schematic illustration of projected ellipsoids.

Heretofore, the preferred embodiment of the present invention utilizes positional information derived from a projected pattern to obtain focus and tilt information. It will be appreciated by those skilled in the art that other parameters such as shape can be used to derive both focus and tilt correction from a projected pattern. FIG. 7 schematically illustrates an alternative embodiment of the present invention where shape information is used to derive both focus and tilt correction. The optical arrangement shown in FIG. 7 is substantially the same as that of FIG. 1, except that an astigmatic lens 146 replaces the field lens 46 (FIG. 1). The astigmat 146 functions to alter the shape of each light spot that is imaged onto the camera 52 in accordance with the relative z-position of the surface 30 with respect to the microscope focal plane 21. The shape of each spot image is characterized by an eccentricity, $\epsilon$, defined herein as $\epsilon \equiv (lx-ly)/(lx+ly)$ where lx and ly (FIG. 8, arrows 145 and 143 respectively) are the lengths of the ellipsoid axis. The value of $\epsilon$ ranges from −1 to 1 and characterizes the shape of the ellipse independent of size. The eccentricity of each spot image will depend upon the local z-position of the spot with respect to the microscope focal plane 21. FIG. 8 schematically illustrates how the light spot array 70 produces spot images that change depending upon the local test surface position. For example, the test surface 30 is rotated a small amount about the axis 144 with respect to the focal plane 21. When a light spot is incident on a portion of the test surface that lies on the microscope focal plane 21, such as the spot 148, then the eccentricity of the spot image is substantially zero. When the spot is lower than the focal plane 21, as is the spot 150, then the spot image eccentricity may be negative, and conversely it may be positive when the spot is above the focal plane 21 as is the spot 152. Thus, at least three spots incident on the test surface 30 are sufficient to define an average position of the test surface 30 relative to the focal plane 21 and additionally an average orientation relative to the focal plane 21. From the average position and average orientation, focus and tilt errors may be estimated. Similar to the previous embodiment, local spot eccentricity provides a unique measure for local z-position, thus allowing a single image, open loop focus/tilt correction.

It will be appreciated that the present inventive autofocus and tilt system provides a unique means for positioning a test surface in an inspection microscope with high accuracy and high throughput. Considering the growing demand for optical inspection in manufacturing, the present invention represents a valuable contribution to manufacturing-based optical inspection systems. The present invention has been described in conjunction with preferred embodiments thereof. Many modifications and variations of the disclosed embodiments of the apparatus and method will be apparent to those of ordinary skill in the art. The foregoing disclosure and the following claims are intended to cover all such modifications and variations.

What is claimed is:

1. A microscope having an autofocus system comprising:
   a microscope stage for mounting a test surface in opposition to a microscope objective, said microscope objective having a focal plane,
   a light pattern generator for projecting a light pattern onto the test surface through the microscope objective;
   an imaging system for recording an image of the light pattern on the test surface;
   a processor for analyzing portions of said light pattern image, said processor determining positions of said at least one portion of the light pattern image, said processor further determining a focus error from said positions;
   a motion control system for applying a focus correction to the microscope stage in response to said focus error; and
   wherein the light pattern has a focal plane offset from said focal plane of the microscope objective.

2. The microscope of claim 1, wherein the processor further determines a tilt error from the light pattern image, and the motion control system applies a tilt correction to the microscope stage in response to the tilt error.

3. The microscope of claim 1, wherein the portions of the light pattern comprise substantially circular light spots.

4. The microscope of claim 1, wherein the positions of respective portions of said light pattern are determined by calculating centroids of respective portions of said light pattern image.

5. The microscope of claim 1, wherein the focus error is determined by comparing the positions of respective portions of said light pattern with a set of predetermined positions.

6. An autofocus apparatus for a microscope comprising:
   a focus stage for positioning a test surface substantially on a focal plane of the microscope;
   a light pattern generator for projecting a light pattern onto the test surface through an objective of the microscope;
   an imaging system for recording an image of the light pattern on the test surface;
   a processor for analyzing portions of said light pattern image, said processor determining positions of said portions of the light pattern image, said processor further determining a focus error from said positions;
   a motion control system for applying a focus correction to the focus stage in response to said focus error; and
   wherein the light pattern has a focal plane offset from said focal plane of the microscope.

7. The autofocus apparatus of claim 6, wherein the processor further determines a tilt error from the light pattern image, and the motion control system applies a tilt correction to the microscope stage in response to the tilt error.

8. The autofocus apparatus of claim 6, wherein the portions of the light pattern comprise substantially circular light spots.

9. The autofocus apparatus of claim 6, wherein the positions of respective portions of said light pattern are determined by calculating centroids of respective portions of said light pattern image.

10. The autofocus apparatus of claim 6, wherein the focus error is determined by comparing the positions of respective portions of said light pattern with a set of predetermined positions.

11. The autofocus apparatus of claim 6, wherein the light pattern generator comprises a laser light source and a holographic grating.

12. The autofocus apparatus of claim 6, further comprising an astigmatic field lens.

13. A method for focusing a test surface in a microscope, the method comprising:

positioning a test surface near a microscope focal plane;

projecting a light pattern onto the test surface through the microscope;

recording an image of the light pattern on the test surface;

analyzing portions of the light pattern image to determine positions of said portions;

determining a focus error from said positions;

applying a focus correction to the test surface in response to said focus error; and wherein projecting said light pattern through the microscope defines a light pattern focal plane, said light pattern focal plane being displaced from said microscope focal plane.

14. The method of claim 13, wherein determining a focus error from said positions comprises comparing said positions to a set of predetermined positions.

15. The method of claim 13, further comprising determining a tilt error from the light pattern image and applying a tilt correction to the test surface.

16. The method of claim 15, wherein determining the tilt error comprises estimating a projection of the light pattern onto a plane, said plane being tilted with respect to the microscope focal plane.

17. The method of claim 13, further comprising measuring the shape of said portions of the light pattern image.

18. Am automatic tilt system for a microscope comprising:

a rotatable stage for mounting a test surface in opposition to a microscope objective defining a first focal plane;

a light pattern generator for projecting a light pattern defining a second focal plane onto the test surface through the microscope objective wherein said second focal plane is offset from said first focal plane;

an imaging system for recording an image of the light pattern on the test surface;

a processor for analyzing portions of said light pattern image, said processor determining a tilt error from said portions of said light pattern image; and a motion control system for applying a tilt correction to the microscope stage in response to said tilt error.

19. The automatic tilt system of claim 18, wherein the processor further determines a focus error from said portions of said light pattern image and the motion control system applies a focus correction in response to said focus error.

20. The automatic tilt system of claim 18, wherein the processor determines positions of respective portions of said light pattern image.

21. The automatic tilt system of claim 18, wherein the processor determined shapes of respective portions of said light pattern image.

22. An autofocus system for a microscope comprising:

a microscope stage having a rotatable and translatable mounting surface positioned in opposition to a microscope objective defining a first focal plane;

a light pattern generator configured to project a light pattern onto a test surface mounted on said microscope stage, said light pattern projected through the microscope objective and defining a second focal plane;

an imaging system for recording an image of the light pattern on the test surface;

a processor for analyzing said light pattern image, said processor determining a focus error and a tilt error from said light pattern image;

a motion control system for applying a focus and tilt correction to the microscope stage in response to said focus and tilt error; and wherein said first focal plane is offset from said second focal plane so at least one of a size and a shape of the light pattern changes as the test surface is translated or tilted.

23. The autofocus system of claim 22, wherein the processor analyzes portions of said light pattern image to determine positions of respective portions of said light pattern image.

24. The autofocus system of claim 22, wherein the processor determines a shape of a portion of said light pattern image.

25. An autofocus apparatus for a microscope comprising:

a focus stage for positioning a test surface substantially at a microscope focal plane of the microscope;

a light pattern generator for projecting a light pattern onto the test surface through an objective of the microscope;

an imaging system for recording an image of the light pattern on the test surface; a processor for analyzing a portion of said light pattern image, said processor determines an image parameter, the image parameter including at least one of a position and a shape of said portion of said light pattern image, and said processor computes a focus error based on the at least one of a position and a shape; and wherein the light pattern is projected onto the test surface such that the light pattern subtends substantially all of the test surface within a field of view of the microscope.

26. The autofocus apparatus of claim 25, further comprising a focus lens positioned along an optical axis of the objective, wherein the focus lens defines a second focal plane at which the light pattern converges to a singular light spot, and wherein the microscope focal plane and the second plane are offset.

27. The autofocus apparatus of claim 25, wherein said imaging system includes a light source and a camera.

28. The autofocus apparatus of claim 27, wherein said light source is a HeNe laser.

29. The autofocus apparatus of claim 27, wherein said camera is a CCD camera.

30. The autofocus apparatus of claim 25, wherein the light pattern generator is an aperture array.

31. A method for focusing a test surface in a microscope, the method comprising the steps of:

locating a test surface substantially at a microscope focal plane;

projecting a light pattern onto the test surface;

recording an image of the light pattern on the test surface;

analyzing a portion of the light pattern image to determine at least one of a position and a shape of said portion;

determining a focus error based on said at least one of the position and the shape; and wherein the light pattern subtends substantially all of the test surface.

32. The method of claim 31, further comprising determining a tilt error from the light pattern image and applying a tilt correction to the test surface.

33. The method of claim 31, wherein said light pattern defines a light pattern focal plane, said light pattern focal plane being displaced from said microscope focal plane.

34. The method of claim 31, further comprising measuring the shape of said portions of the light pattern image.

35. The method of claim 31, further including the step of applying a focus correction to the test surface in response to said determining step.

36. The autofocus apparatus of claim 25, further comprising a motion control system for applying a focus correction to the microscope stage in response to said focus error.

37. The autofocus apparatus of claim 25, where in the processor further determines a tilt error from the light pattern image, and the motion control system applies a tilt correction to the microscope stage in response to the tilt error.

38. The autofocus apparatus of claim 25, wherein the portions of the light pattern comprise substantially circular light spots.

39. The autofocus apparatus of claim 25, wherein the positions of respective portions of said light pattern are determined by calculating centroids of respective portions of said light pattern image.

40. The autofocus apparatus of claim 25, wherein the focus error is determined by comparing the positions of respective portions of said light pattern with a set of predetermined positions.

41. The autofocus apparatus of claim 25, wherein the light pattern generator comprises a laser light source and a holographic grating.

42. The autofocus apparatus of claim 25, further comprising a focus lens positioned along an optical axis of the objective, wherein the focus lens defines a second focal plane at which the light pattern converges to a singular light spot, and wherein the microscope focal plane and the second plane are offset.

43. The method of claim 31, wherein said determining a focus error from said positions step comprises comparing said positions to a set of predetermined positions.

44. The method of claim 32, wherein said determining a tilt error step comprises estimating a projection of the light pattern onto a plane, said plane being tilted with respect to the microscope focal plane.

* * * * *